United States Patent
Nakashima et al.

(10) Patent No.: US 9,435,389 B2
(45) Date of Patent: Sep. 6, 2016

(54) VEHICULAR FLUID POWER TRANSMITTING DEVICE

(71) Applicants: Yoichi Nakashima, Nissin (JP); Toshiya Yamashita, Toyota (JP); Naoki Itazu, Nagoya (JP); Masaru Ebata, Chita (JP); Yasunori Doman, Hirakata (JP); Takashi Hori, Anjo (JP)

(72) Inventors: Yoichi Nakashima, Nissin (JP); Toshiya Yamashita, Toyota (JP); Naoki Itazu, Nagoya (JP); Masaru Ebata, Chita (JP); Yasunori Doman, Hirakata (JP); Takashi Hori, Anjo (JP)

(73) Assignees: TOYOTA JIDOSHA KABUSHIKI KAISHA, Toyota-Shi (JP); AISIN AW CO., LTD., Anjo-Shi (JP); EXEDY CORPORATION, Neyagawa-Shi (JP)

( * ) Notice: Subject to any disclaimer, the term of this patent is extended or adjusted under 35 U.S.C. 154(b) by 353 days.

(21) Appl. No.: 14/347,344

(22) PCT Filed: Sep. 28, 2012

(86) PCT No.: PCT/IB2012/001911
§ 371 (c)(1),
(2) Date: Mar. 26, 2014

(87) PCT Pub. No.: WO2013/046006
PCT Pub. Date: Apr. 4, 2013

(65) Prior Publication Data
US 2014/0238008 A1    Aug. 28, 2014

(30) Foreign Application Priority Data

Sep. 29, 2011   (JP) .................................. 2011-214879

(51) Int. Cl.
| F16D 33/00 | (2006.01) |
| --- | --- |
| F16D 43/286 | (2006.01) |
| F16D 33/20 | (2006.01) |
| F16H 41/24 | (2006.01) |

(Continued)

(52) U.S. Cl.
CPC ............. *F16D 43/286* (2013.01); *F16D 33/20* (2013.01); *F16F 15/123* (2013.01); *F16H 41/24* (2013.01); *F16H 2045/0252* (2013.01); *F16H 2045/0294* (2013.01)

(58) Field of Classification Search
CPC ................... F16H 41/24; F16H 41/26; F16H 2045/0221; F16H 2045/0252; F16D 33/18; F16D 33/20
See application file for complete search history.

(56) References Cited

U.S. PATENT DOCUMENTS 4,783,960 A * 11/1988 Kubo ..................... F16H 41/04
60/338
4,966,261 A * 10/1990 Kohno .................... F16H 41/24
192/213.11

(Continued)

FOREIGN PATENT DOCUMENTS

| CN | 101988569 A | 3/2011 |
| CN | 102171493 A | 8/2011 |

(Continued)

Primary Examiner — Michael Leslie
(74) Attorney, Agent, or Firm — Kenyon & Kenyon LLP (57) ABSTRACT

A vehicular fluid power transmitting device includes a pump impeller, a turbine runner, a damper device, and a ring-shaped annular set member. The pump shell has a rear shell and a front shell that is connected to the rear shell. Also, the ring-shaped annular set member connects the damper output member to the front shell and is fixed to the front shell. An intermediate position between a position of an outer radius of the front shell and a position of a radius of the cylindrical shaft is included in a width (W) of the annular set member in a radial direction of the annular set member.

4 Claims, 7 Drawing Sheets

(51) Int. Cl.
*F16F 15/123* (2006.01)
*F16H 45/02* (2006.01)

(56) References Cited

U.S. PATENT DOCUMENTS

| | | | |
|---|---|---|---|
| 5,398,562 A * | 3/1995 | Muchmore | F02N 15/04 464/68.4 |
| 6,959,544 B2 * | 11/2005 | Fukunaga | F16H 41/26 60/330 |
| 2011/0195795 A1 | 8/2011 | Murata et al. | |

FOREIGN PATENT DOCUMENTS

| | | |
|---|---|---|
| DE | 10036634 A1 | 2/2001 |
| DE | 102005034933 A1 | 2/2007 |
| JP | 05-050202 U | 7/1993 |
| JP | 06-006796 A | 1/1994 |
| JP | 2008-075843 A | 4/2008 |
| JP | 2010-084852 A | 4/2010 |
| JP | 2010-138979 A | 6/2010 |
| JP | 2010-255753 A | 11/2010 |
| WO | 2010/038131 A2 | 4/2010 |

* cited by examiner

FIG.8

VEHICULAR FLUID POWER TRANSMITTING DEVICE

CROSS-REFERENCE TO RELATED APPLICATIONS

This is a national phase application based on the PCT International Patent Application No. PCT/IB2012/001911 filed on Sep. 28, 2012, claiming priority to Japanese application No. 2011-214879 filed Sep. 29, 2011, the entire contents of both of which are incorporated herein by reference.

BACKGROUND OF THE INVENTION

1. Field of the Invention

The invention relates to a fluid power transmitting device provided in a vehicle.

2. Description of Related Art

A vehicular fluid power transmitting device provided in a power transmission path between a power source of a vehicle and an automatic transmission is known. This vehicular fluid power transmitting device transmits torque generated by the power source to an input shaft of the automatic transmission via fluid. Some known examples of a vehicular fluid power transmitting device are a fluid coupling and a torque converter. A fluid coupling is provided with a pump impeller and a turbine runner. The pump impeller is rotatably driven about an axis by a drive source such as an engine. The turbine runner is rotated about this axis by operating fluid that is pushed out by the pump impeller. A torque converter is described in Japanese Utility Model Application Publication No. 05-050202 (JP 05-050202 U), for example. The torque converter is also provided with a stator that is arranged between the pump impeller and the turbine runner, in a manner rotatable about the axis.

In such a vehicular fluid power transmitting device as that described above, an input device such as a drive plate or a damper device inputs torque from an engine that is the drive source of the vehicle to the pump impeller. The input device is provided with protrusions that are attached in a protruding manner in a plurality of locations at predetermined intervals on the circumference of a circle to a pump shell of the pump impeller by welding or the like. The input device is fixed to the pump shell by a plurality of nuts or the like that screw onto the protrusions. Alternatively, the input device is fixed to the pump shell by a plurality of set bolts that screw into a plurality of set blocks. Here, the plurality of set blocks are fixed at predetermined intervals on the circumference of a circle by welding or the like to the pump shell of the pump impeller.

In the fluid power transmitting device described in JP 05-050202 U, a damper device is provided between a crankshaft of the engine and the set blocks that are fixed to radially outer portions of the pump shell. Therefore, springs of the damper device are positioned farther to the radially inner side than the set blocks, so damper performance is unable to be sufficiently obtained. In contrast, it is conceivable to move the set blocks to the radially inner side of the pump shell, and position the springs of the damper device that are provided between these set blocks and the crankshaft of the engine on the radially outer side of the set blocks.

With this structure, a front side of the pump shell is formed curved so as to form a relatively large space between the pump shell and the drive plate that is fixed to the shaft end of the crankshaft, and interpose the damper device therein. Therefore, when the pressure of operating oil inside of the pump shell increases or centrifugal force is applied when the pump shell rotates, in particular, the amount of deformation toward the rear where the radially inner side on the front side of the pump shell becomes the fulcrum increases. Therefore, the plate thickness of the pump shell must be increased to inhibit this expansion and deformation amount, which decreases formability and increases manufacturing cost, which is problematic.

SUMMARY OF THE INVENTION

The invention thus provides a vehicular fluid power transmitting device in which a damper device is provided on a pump shell.

A first aspect of the invention relates to a vehicular fluid power transmitting device that includes a pump impeller, a turbine runner, a damper device and a ring-shaped annular set member. The pump impeller has a plurality of pump blades provided inside, of a pump shell to which torque from a drive source is input. The turbine runner has a plurality of turbine blades and a hub portion, is supported by a shaft end portion of an output shaft, and is rotated by receiving operating fluid pushed out by the pump blades. The turbine blades are provided in positions opposite the pump blades. The hub portion supports the turbine blades. The damper device is provided between the drive source and the pump shell in an axial direction of the output shaft, and has a damper input member and a damper output member. The damper input member is connected to the drive source. The damper output member transmits torque transmitted via an elastic member from the damper input member, to the pump shell. The ring-shaped annular set member connects the damper output member to the front shell and is fixed to the front shell. The pump shell has a rear shell and a front shell that is connected to the rear shell. The rear shell has the plurality of pump blades and a cylindrical shaft. The pump blades are formed in a radially outer portion of the rear shell. The cylindrical shaft is formed in a radially inner portion of the rear shell and protrudes in a direction away from the drive source. Then, an intermediate position between a position of an outer radius of the front shell and a position of a radius of the cylindrical shaft is included in a width of the annular set member in a radial direction of the annular set member.

With the torque converter according to this aspect of the invention, a intermediate position between a position on the outer radius of the front shell and a position of the radius of the cylindrical shaft, in the radial direction of the annular set member, is included in the width of the annular set member in the radial direction. As a result, the annular set member that is fixed to this front shell has a similar reinforcing effect as a rib. This reinforcing effect increases the rigidity of the front shell, thus inhibiting deformation of the front shell. Deformation of the pump shell occurs when the pressure of operation oil inside the pump shell increases, and when centrifugal force is generated by the rotation of the pump shell, for example.

In the vehicular fluid power transmitting device according to the aspect of the invention described above, the annular set member may be fixed concentrically to the front shell.

In the vehicular fluid power transmitting device according to the mode of the invention described above, the annular set member may have a female screw hole formed in an end surface of the annular set member on the drive source side, and a fastening bolt is screwed into the female screw hole and fastens the damper output member to the annular set member. Also, the width of the annular set member in the radial direction may be two to three times, inclusive, a diameter of the female screw hole. According to this mode, sufficient rigidity is obtained in the annular set member that is fixed to the front shell. This reinforcing effect of the annular set member increases the rigidity of the front shell, thus inhibiting deformation of the pump shell.

In the vehicular fluid power transmitting device according the mode of the invention described above, a thickness in the axial direction of the annular set member may be two or more times a plate thickness of the front shell to which the annular set member is fixed. According to this mode, sufficient rigidity is obtained in the annular set member that is fixed to the front shell. This reinforcing effect of the annular set member increases the rigidity of the front shell.

In the vehicular fluid power transmitting device according to the mode of the invention described above, the annular set member may be fixed by at least a radially outer side of the annular set member being welded to the front shell. According to this mode, the annular set member reliably functions as a rib for increasing the rigidity of the front shell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described in detail with reference to the accompanying drawings.

Figure 1:
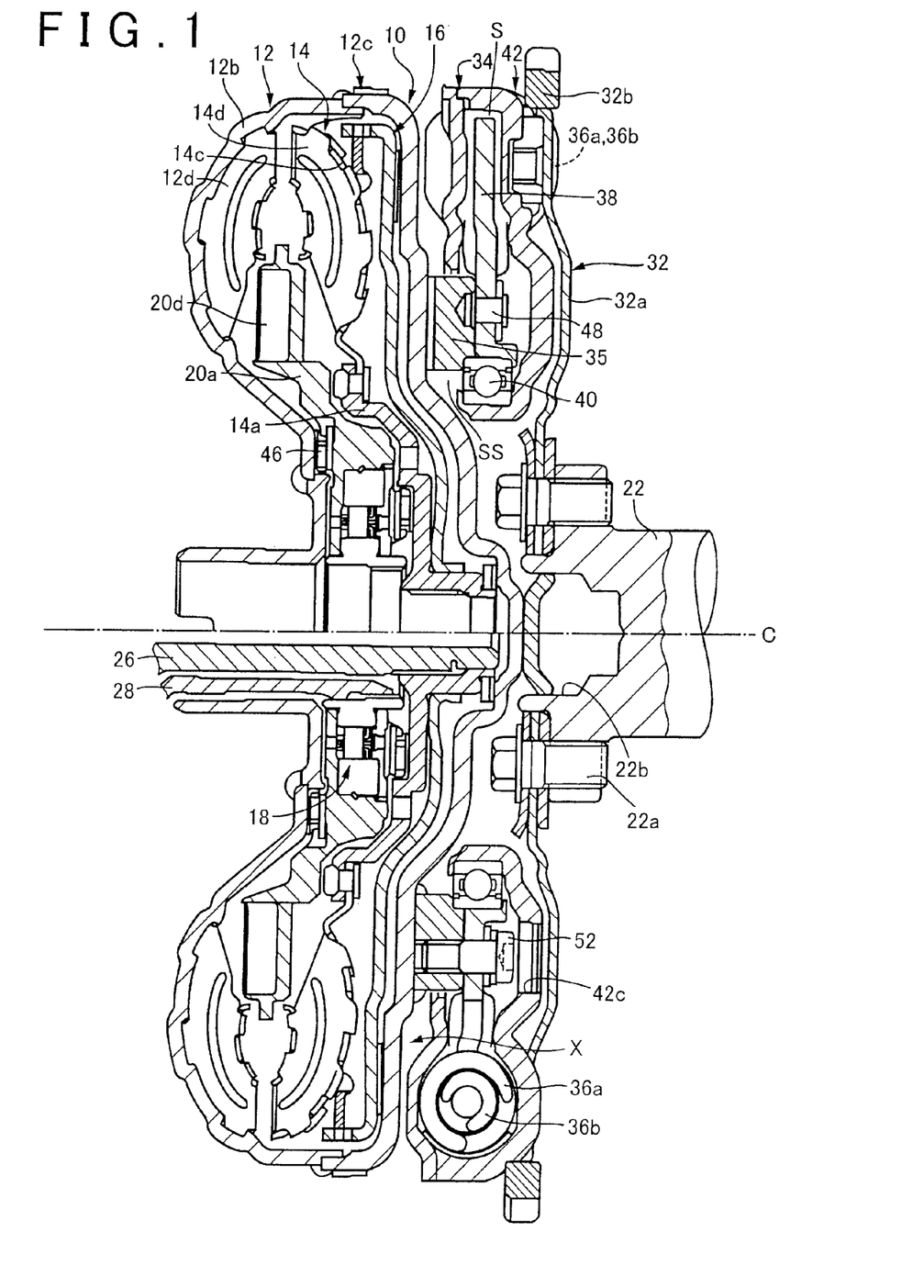
FIG. 1 is a sectional view of the structure of a vehicular torque converter according to a first example embodiment of the invention.
Figure 2:
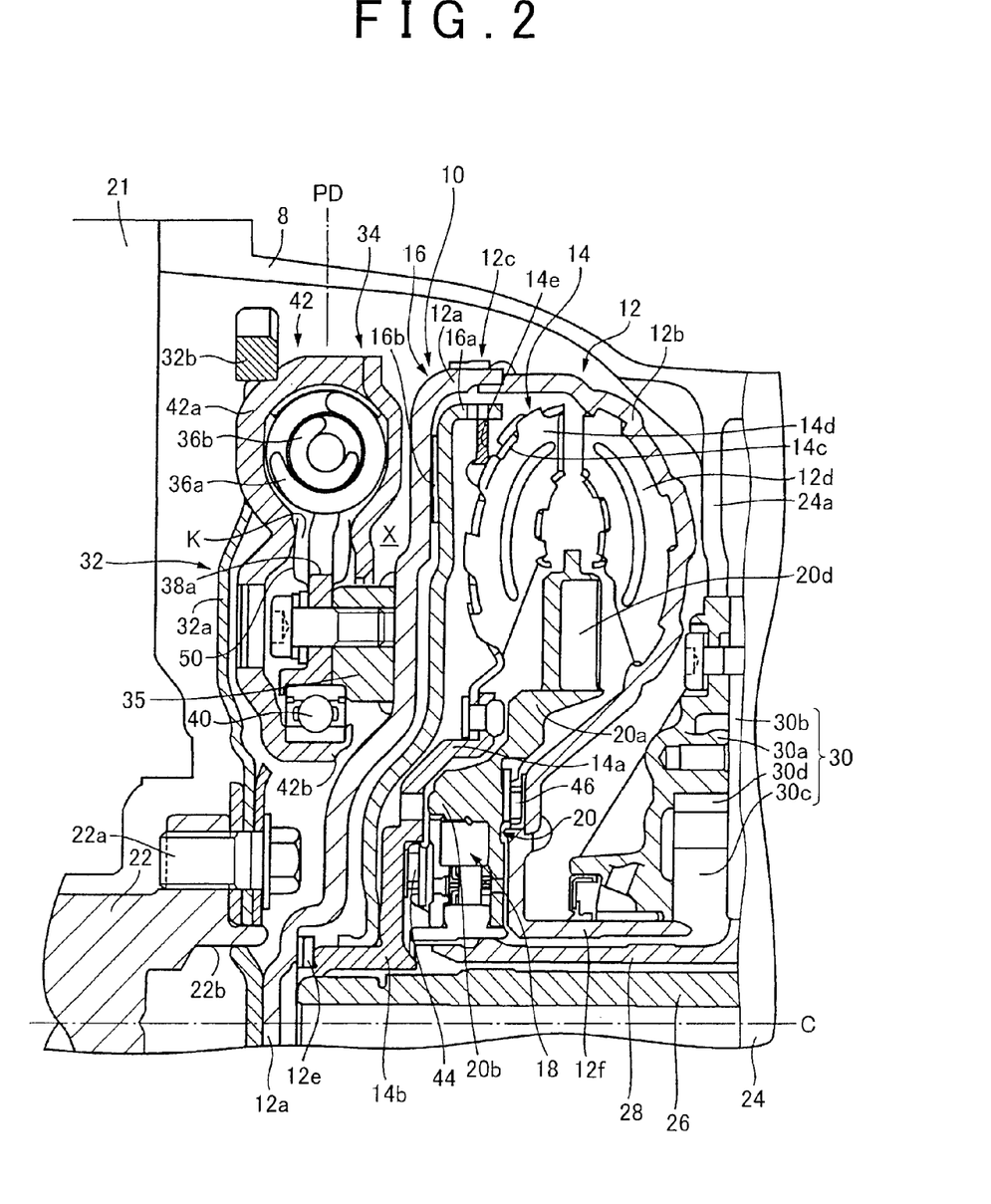
FIG. 2 is an enlarged view of the vehicular torque converter in FIG. 1 inside of a housing.

FIG. 1 is a sectional view of the structure of a torque converter 10 that is a vehicular fluid power transmitting device according to a first example embodiment of the invention. FIG. 2 is a view of the vehicular torque converter 10 inside of a cylindrical housing 8 of the vehicle. The torque converter 10 is provided with a pump impeller 12, a turbine runner 14, a lock-up clutch 16, a one-way clutch 18, and a stator 20. The torque converter 10 multiplies torque input from a crankshaft 22 of an engine 21 that functions as a drive source. This torque converter 10 then outputs the multiplied torque from an input shaft 26 of a transmission 24 that functions as an output shaft of the torque converter 10.

The pump impeller 12 includes a pump shell 12c, pump blades 12d, and a cylindrical shaft 12f. The pump shell 12c is formed by a pair of disc-shaped shells, i.e., a front shell 12a and rear shell 12b, of which outer peripheral edges are joined together in an oil-tight manner by welding. The pump shell 12c is connected to the crankshaft 22 of the engine 21 via a drive plate 32 and a damper device 34. Therefore, the pump shell 12c is able to be rotated about an axis C at the same speed as the crankshaft 22. The plurality of pump blades 12d are arranged overlapping each another in the circumferential direction on the radially outer side, inside of the rear shell 12b. The cylindrical shaft 12f protrudes toward the damper device 34 side from a radially inner portion of the pump shell 12c. The turbine runner 14 includes a disc-shaped hub portion 14a, a cylindrical shaft portion 14b, a turbine shell 14c, and turbine blades 14d. The hub portion 14a is spline-engaged with a shaft end portion of the input shaft 26, and is relatively rotatably abutted against the front shell 12a via a sliding ring 12e (i.e., abutted against the front shell 12a via the sliding ring 12e in a manner so as to be able to rotate relative to the front shell 12a). That is, the hub portion 14a is relatively non-rotatably engaged with the shaft end portion of the input shaft 26. The cylindrical shaft portion 14b protrudes from the radially center portion of the hub portion 14a and is spline-engaged with the shaft end portion of the input shaft 26. The plurality of turbine blades 14d are fixed to a radially outer portion of the hub portion 14a, in a manner overlapping with each other in the circumferential direction. Also, the turbine blades 14d are fixed opposing the pump blades 12d. The turbine runner 14 is provided so as to rotate, together with the input shaft 26, about the axis C. The stator 20 includes a circular disc portion 20a and a circular cylindrical portion 20b. Stator blades 20d are provided on a radially outer portion of the circular disc portion 20a. These stator blades 20d are positioned between the pump blades 12d of the pump impeller 12 and the turbine blades 14d of the turbine runner 14. The circular cylindrical portion 20b is formed on a radially inner portion of the circular disc portion 20a, and is fitted with the one-way clutch 18. The stator 20 is supported by a cylindrical fixed shaft 28 that is a non-rotating member that is fixed to the housing 8. The stator 20 is able to rotate about the axis C with respect to the cylindrical fixed shaft 28 via the one-way clutch 18. A first thrust bearing 44 on a front side is interposed between the stator 20 and the hub portion 14a of the turbine runner 14. Also, a second thrust bearing 46 on a rear side is interposed between the stator 20 and the rear shell 12b. Therefore, the position of the stator 20 in the direction of the axis C is determined. Here, the front side refers to the side that is relatively closer to the engine 21 in the direction along the axis C. Also, the rear side refers to the side that is relatively closer to the transmission 24 in the direction along the axis C. Also, the direction along the axis C may also be simply referred to as the "axial direction". That is, the axial direction of the output shaft of the torque converter 10 may also be regarded as the direction along the axis C A partition wall 24a is provided inside the housing 8. The partition wall 24a divides the housing 8 into a space in which the transmission 24 is housed and a space in which the torque converter 10 is housed. A hydraulic pump 30 is provided on this partition wall 24a. The hydraulic pump 30 includes a pump body 30a, a pump cover 30b, an inner ring gear 30c, and an outer ring gear 30d. The pump body 30a is fixed to the partition wall 24a. The pump cover 30b is fixed to the pump body 30a. The inner ring gear 30c and the outer ring gear 30d are rotatably housed within a space formed between the pump body 30a and the pump cover 30b, and are in mesh with each other. A shaft end of a cylindrical shaft 12f is engaged in a relatively non-rotatable manner with the inner ring gear 30c, i.e., in a manner so as not to be able to rotate relative to the inner ring gear 30c. The cylindrical shaft 12f is arranged radially inward of the rear shell 12b of the pump impeller and protrudes in the axial direction. As a result, the hydraulic pump 30 is rotatably driven by the engine 21. The hydraulic pump 30, i.e., the pump body 30a, protrudes out in a conical shape from the partition wall 24a toward the torque converter 10 side, i.e., the engine 21 side or the input side. The input shaft 26 is rotatably supported by the partition wall 24a via a bearing, not shown. The input shaft 26 protrudes into the space within which the torque converter 10 is housed and supports the torque converter 10.

Hereinafter, when not specifically stated, the output side or the transmission 24 side refers to the side relatively close to the transmission 24 in the axial direction. Similarly, when not specifically stated, the input side or the engine. 21 side refers to the side relatively close to the engine 21 in the axial direction. The radially outer portion of the rear shell 12b and the radially outer portion of the front shell 12a are offset so as to protrude toward the output side thereof, i.e., the transmission 24 side. The rear shell 12b constitutes the output side i.e., the transmission 24 side, of the pump shell 12c. Also, the front shell 12a constitutes the input side, i.e., the engine 21 side, of the pump shell 12c. Therefore, the radially inner portion of the rear shell 12b is concave-shaped toward the input side and receives a tip end portion of the pump body 30a. That is, the tip end portion of the pump body 30a overlaps in the radial direction with the radially outer portion of the rear shell 12b. As a result, space is able to be utilized efficiently, so the dimension of the torque converter 10 in the direction of the axis C is short.

The radially outer portion of the rear shell 12b protrudes toward the transmission 24 side. Therefore, the pump blades 12d that are arranged on an inside wall surface of the radially outer portion of the rear shell 12b are also offset toward the output side. Thus, the stator blades 20d and the turbine blades 14d are also offset toward the output side, i.e., the transmission 24 side, while maintaining a constant relative positional relationship with the pump blades 12d. In this example embodiment, the radially outer portion of the circular disc portion 20a of the stator 20 is positioned farther toward the transmission 24 side than the circular cylindrical portion 20b, and is formed in a conical shape. Accordingly, the stator blades 20d are offset toward the output side so as not to overlap in the radial direction with the one-way clutch 18. Also, the radially outer portion of the hub portion 14a of the turbine runner 14 is offset toward the output side by being formed in a conical shape that overlaps in the radial direction with the one-way clutch 18. Therefore, a portion of the turbine blades 14d does not overlap in the radial direction with the one-way clutch 18, and a portion of the turbine blades 14d does overlap in the radial direction with the one-way clutch 18.

The lock-up clutch 16 includes a circular disc-shaped piston 16a and an annular friction element 16b. A radially center portion of the piston 16a is slidably engaged with the outer peripheral surface of the cylindrical shaft portion 14b that protrudes from a radially center portion of the hub portion 14a. Also, the piston 16a is relatively non-rotatably engaged with an engaging protrusion 14e that protrudes from the turbine shell 14c. The friction element 16b is fixed to a radially outer portion of the piston 16a, or a portion of the inside of the front shell 12a opposite the radially outer portion of the piston 16a. The friction element 16b directly connects the turbine runner 14 and the pump impeller 12 to each other by frictional force. As described above, the radially outer portion of the front shell 12a constitutes the input side portion, i.e., the engine 21 side portion, of the pump shell 12c is offset so as to protrude toward the output side, i.e., the transmission 24 side. Therefore, the radially outer portion of the piston 16a is also similarly offset so as to protrude toward the output side, i.e., the transmission 24 side. As a result, the piston 16a is prevented from interfering with the front shell 12a and the turbine runner 14. In this way, the radially outer portions of the front shell 12a and the piston 16a of the lock-up clutch 16 are offset toward the output side. Therefore, both the radially outer portion of the piston 16a of the lock-up clutch 16 and the friction element 16b that is fixed to the piston 16a overlap in the radial direction with the one-way clutch 18.

The drive plate 32 that is fixed to the shaft end of the crankshaft 22 of the engine 21 includes a circular disc-shaped portion 32a and a ring gear 32b. The ring gear 32b is fixed to a radially outer portion of the circular disc-shaped portion 32a, and is in mesh with a pinion of a stator motor, not shown. The damper device 34 is provided between this drive plate 32 and the front shell 12a that constitutes a front portion of the pump shell 12c.

The damper device 34 includes a circular disc-shaped driven plate 38 and a damper shell 42. A radially inner portion of the driven plate 38 is fixed to the front shell 12a via a ring-shaped annular set member 35 that is concentric with the axis C. Also, notches 38a are formed in a plurality of locations at equidistant intervals in the radially outer portion of the driven plate 38. The notches 38a are open to the radially outer side so as to receive two types of damper springs, i.e., a large damper spring 36a and a small damper spring 36b. The large damper spring 36a and the small damper spring 36b are wound in coil-shapes such that the circumferential direction of the damper device 34 is a longitudinal direction of the large damper spring 36a and the small damper spring 36b, and are concentric with each other. The damper shell 42 is rotatably supported about the axis C via an annular bearing 40 by the annular set member 35 that is fixed to the front shell 12a. The damper shell 42 is fixed to the circular disc-shaped portion 32a of the drive plate 32. Also, circular columnar-shaped spaces that extend in the circumferential direction are formed in a plurality of locations at equidistant intervals in the circumferential direction in the damper shell 42. These circular columnar-shaped spaces receive the pair of damper springs, i.e., the large damper spring 36a and the small damper spring 36b, so as to cover the outer peripheries thereof. The large damper spring 36a and the small damper spring 36b contract in the circumferential direction, i.e., the longitudinal direction thereof, in response to an offset in the rotational phase between the driven plate 38 and the damper shell 42. As a result, pulsation of torque transmitted from the engine 21 is able to be absorbed.

The damper shell 42 is provided with a spring housing space S and an inner peripheral side opening K. The spring housing space S includes the plurality of circular columnar spaces described above and a communication space that communicates the plurality of circular columnar spaces with each other in the circumferential direction. The opening width of the radially inner side opening K in the direction of the axis C is at least smaller than the diameter of the large damper spring 36a. The radially inner side of the communication space is open to the inner radially side opening K. The radially outer portion of the driven plate 38 is fit into this opening K. A pair of spring steel seal members 50 is fixed by rivets 48 on both sides of the driven plate 38, i.e., one spring steel seal member 50 is on each side of the driven plate 38. These seal members 50 seal this opening K. A lubricant such as grease, for example, is filled into the spring housing space S.

As described above, the radially outer portion of the front shell 12a is offset so as to protrude toward the output side, i.e., the transmission 24 side. Therefore, an annular space X is formed between the radially outer portion of the front shell 12a and the drive plate 32, on the input side of the pump shell 12c, i.e., the engine 21 side. The damper device 34 is arranged in this annular space X. A center position PD of the damper device 34 in the direction of the axis C is positioned farther to the output side than the shaft end of the input shaft 26. The center position PD passes through the center of the large damper spring 36a and the small damper spring 36b. Also, the center position PD is positioned farther to the output side than an end surface of the input side of the cylindrical shaft portion 14b that is positioned on the radially inner portion of the turbine runner 14. As is evident from this, the damper device 34 is positioned so as to overlap with the shaft end portion of the input shaft 26, the radially inner portion of the turbine runner 14, i.e., the cylindrical shaft portion 14b, and the radially inner portion of the front shell 12a, in the radial direction. Accordingly, the radially inner portion of the front shell 12a that constitutes the input side portion of the pump shell 12c protrudes farther toward the input side, i.e., the engine 21 side, than the radially outer portion of the front shell 12a, and overlaps with almost the entire damper device 34 in the radial direction.

As a result, with the damper device 34, the large damper spring 36a and the small damper spring 36b are positioned on the radially outer side compared with the related art. Thus, the coil diameter and the coil wire diameter can both be larger, so the damper device 34 has good flexible damper performance, with a large torsion angle with respect to a change in torque. As a result of the damper device 34 having such good damper performance, torque vibration is able to be efficiently reduced. Therefore, the engine 21 can be operated in a low speed, high load operating range with good combustion efficiency. Also, when running in a locked-up (i.e., direct drive) state by the lock-up clutch 16, the torque converter 10 is supported by the input shaft 26 via the piston 16a and the turbine runner 14. In this example embodiment, the damper device 34 overlaps with the input shaft 26, so when a disturbance such as vibration is input, vibration of the damper device 34 is suppressed, so the damper device 34 is able to be even more stably supported. Also, as described above, the damper device 34 is positioned such that the center position PD in the direction of the axis C thereof overlaps with the shaft end of the input shaft 26 and the cylindrical shaft portion 14b of the turbine runner 14 in the radial direction. Therefore, good operability is able to be achieved during assembly when supporting the torque converter 10 and fitting the one-way clutch 18 and the input shaft 26.

Figure 3:
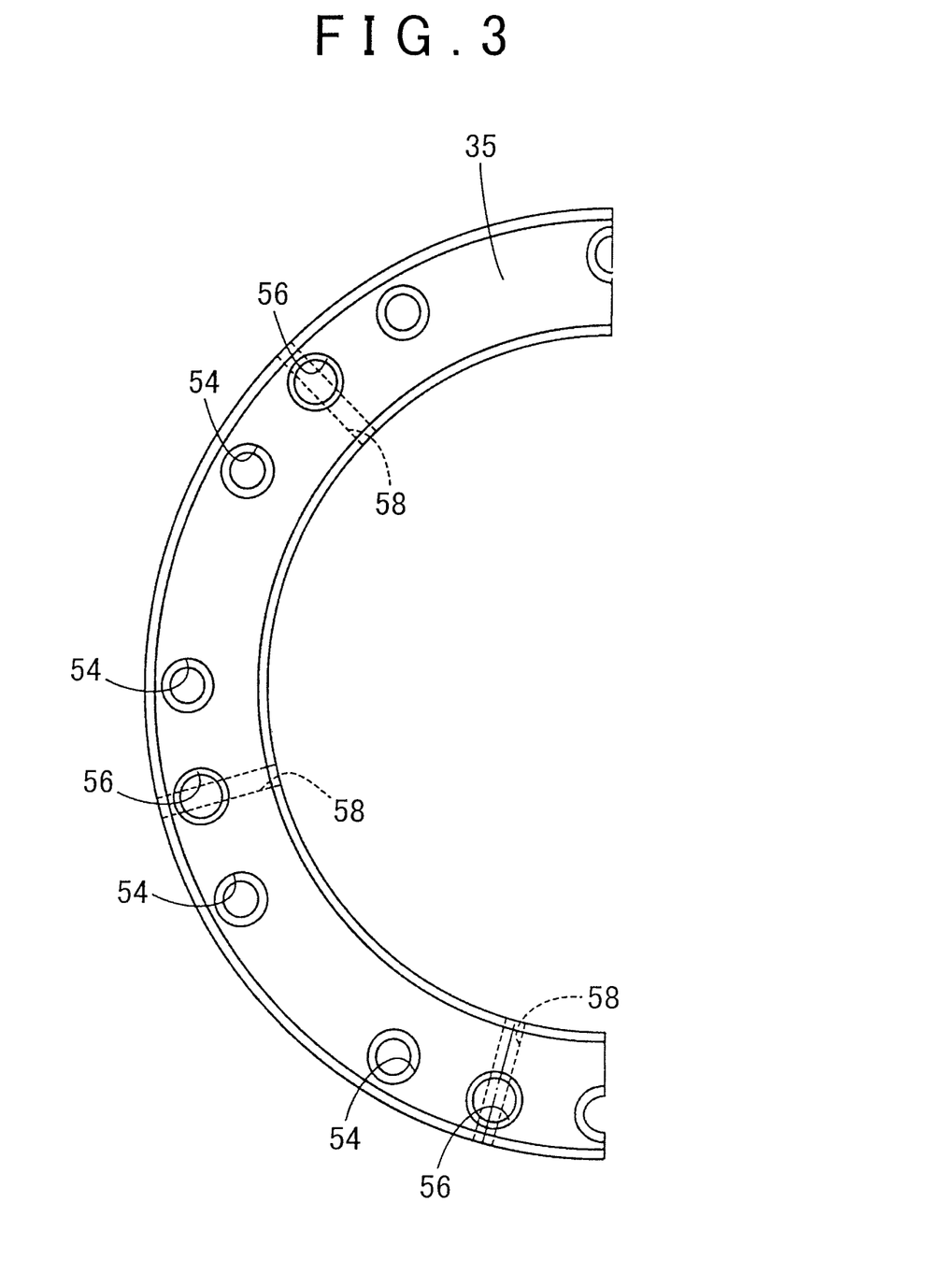
FIG. 3 is a front view showing the structure of an annular set member that is fixed to a pump shell of the vehicular torque converter in FIG. 1, in which half of the annular set member has been cut away.
Figure 4:
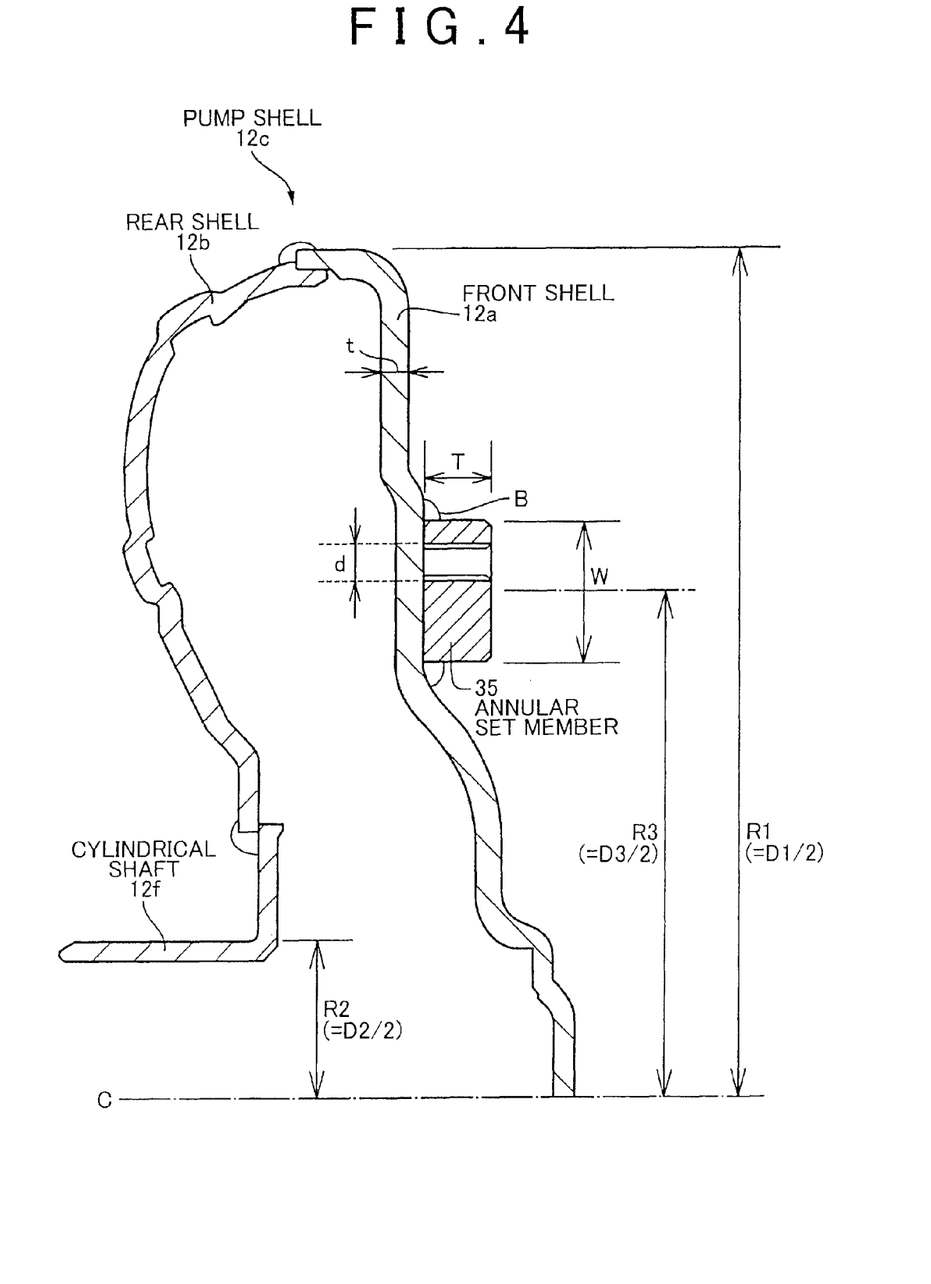
FIG. 4 is a view of an attaching position of the annular set member with respect to a front shell.

FIG. 3 is a front view, from the engine 21 side, of the annular set member 35 that is fixed to the front shell 12a by welding or the like. FIG. 4 is a view of the attaching position of the annular set member 35 with respect to the front shell 12a. In FIG. 3, a plurality of female threaded holes 54 are formed in (i.e., through) the annular set member 35. Set bolts 52 that pass through the driven plate 38 are screwed into the plurality female screw holes 54. The driven plate 38 is fixed to the front shell 12a by these set bolts 52. A plurality of interference preventing holes 56 for preventing interference of the annular set member 35 with the rivets 48 are formed as blind holes in the annular set member 35. Also, throughgrooves 58 that extend through in the radial direction are formed in the surface on the front shell 12a side of the annular set member 35, in positions where the interference preventing holes 56 are formed. Water collects in an annular space S that is open to the radially inner side, between the inner peripheral surface of the annular set member 35, the annular bearing 40, and the front shell 12a. These throughgrooves 58 serve as communication paths that discharge the collected water to the radially outer side by centrifugal force or gravity.

As shown by welding beads B in FIG. 4, the front shell 12a and both the radially outer side and the radially inner side of the annular set member 35 are welded. As a result, the annular set member 35 is fixed to the front shell 12a that forms the engine 21 side of the pump shell 12c. The annular set member 35 has a thickness T in the direction of the axis C that is within a range of 2 to 3 times, and is preferably approximately 2.5 times, a plate thickness t, that is approximately 5 mm, of the front shell 12a. Also, a width W of the annular set member 35 in the radial direction is approximately 0.15 to 0.2 times a radius R1 of the front shell 12a, or approximately 0.25 to 0.35 times an intermediate radius R3 $(=(R1-R2)/2+R2)$ between the radius R1 of the front shell 12a and a radius R2 of the cylindrical shaft 12f, or approximately 2 to 3 times a diameter d of the female screw holes 54. Also, the annular set member 35 is fixed so as to be in a position in which the intermediate radius R3 or a intermediate diameter D3 $(=2 \times R3)$ is within the range of the width W in the radial direction. More preferably, the annular set member 35 is fixed so as to be in a position where the center of the width W of the annular set member 35 is substantially aligned with the intermediate radius R3 or the intermediate diameter D3. That is, an intermediate position between the position of the outer radius R1 of the front shell 12a and a position of the radius R2 of the cylindrical shaft 12f is included in the width W of the annular set member 35 in the radial direction of the annular set member 35.

Figure 5:
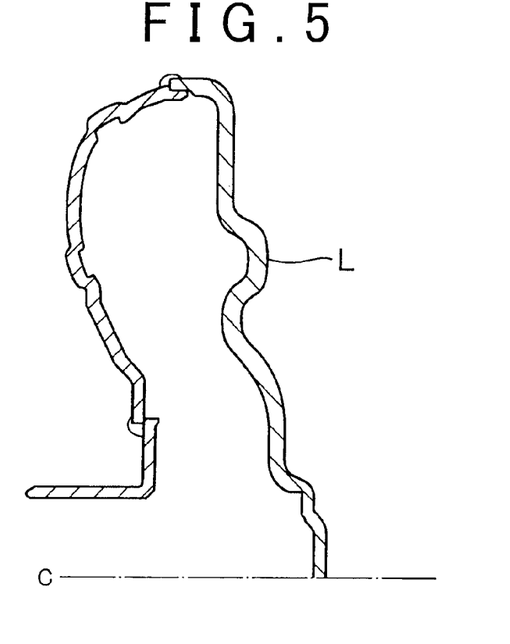
FIG. 5 is a sectional view of a sample of a pump shell in which a reinforcing rib is formed, instead of the annular set member, on the front shell.
Figure 6:
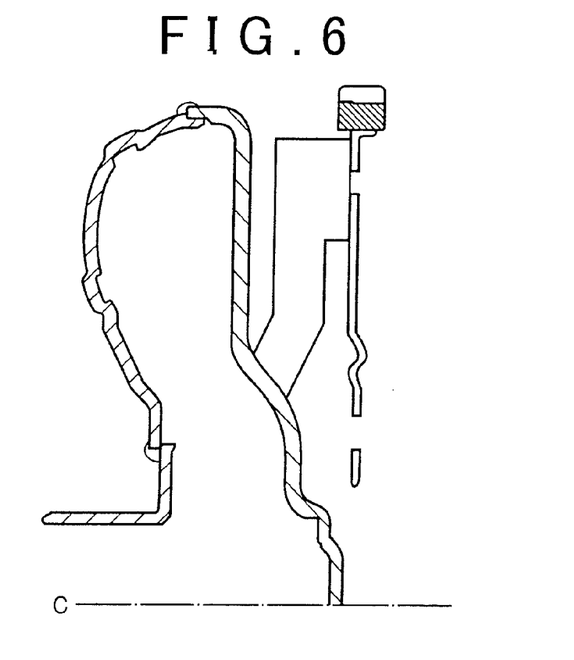
FIG. 6 is a sectional view of the structure of the annular set member in Sample No. 4.

Below, an example of a test performed by the inventors to check the reinforcement effect of the annular set member 35 that is fixed to the front shell 12a will be described. FIG. 5 is a view of a sample of a pump shell in which a reinforcement rib L is formed, instead of the annular set member 35, on the front shell. A pump shell in which the plate thickness t of the front shell is 6 mm is Sample No. 1. A pump shell in which the plate thickness t of the front shell is 5 mm is Sample No. 2. Sample No. 3 is a pump shell in which an annular set member similar to that of the example embodiment is fixed to the front shell 12a when the plate thickness t of the front shell is 5 mm. That is, the intermediate radius R3 or the intermediate diameter D3 $(=2 \times R3)$ is included in the range of the width W of the annular set member of Sample No. 3 in the radial direction. Sample No. 4 is a pump shell in which the annular set member is arranged farther toward the radially inner side than the annular set member of Sample No. 3 is arranged, as shown in FIG. 6, when the plate thickness t of the front shell is 5 mm. As described above, the driven plate 38 is fixed to the annular set member.

Figure 7:
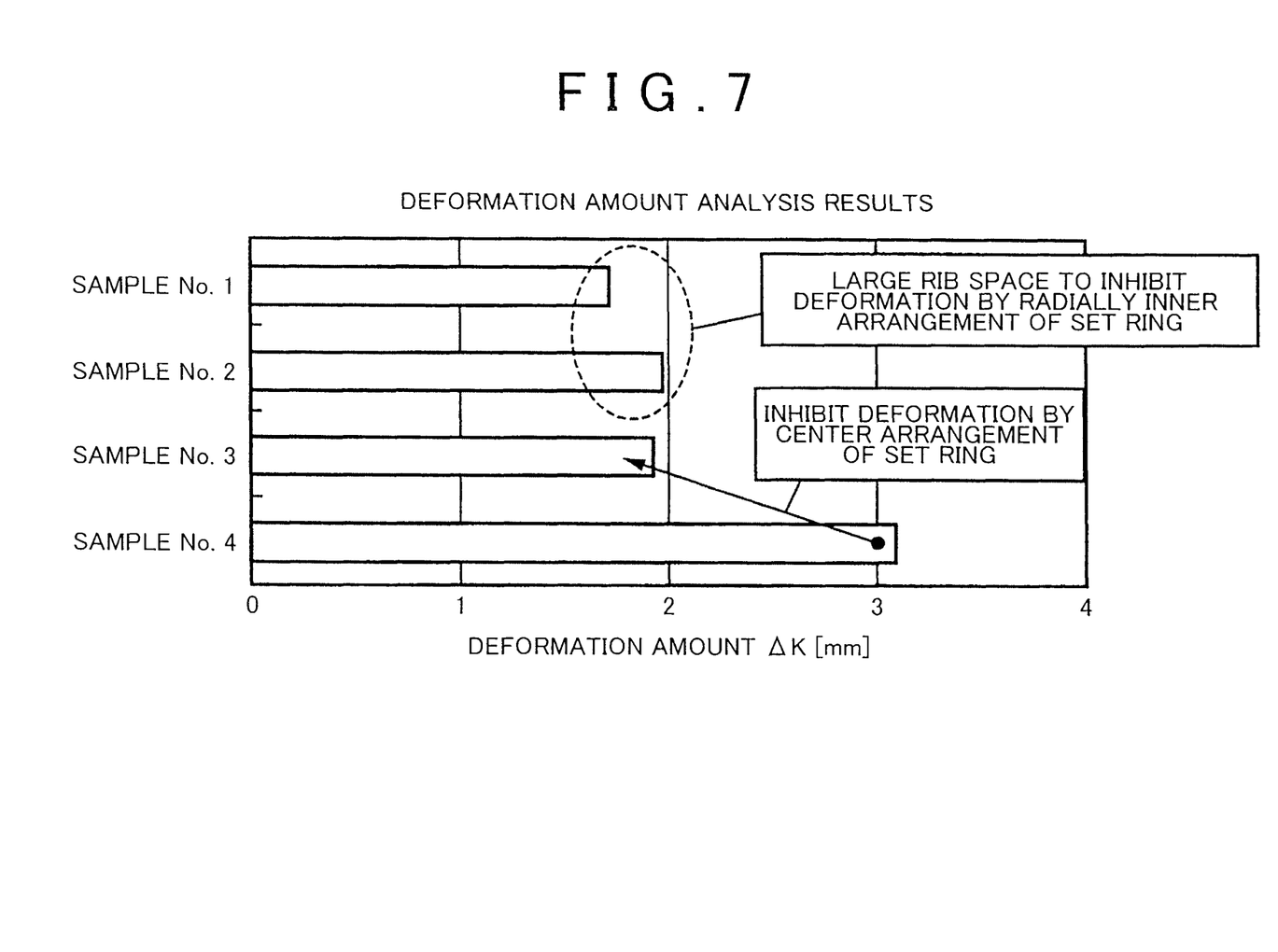
FIG. 7 is a graph of the deformation amount analysis results for the vehicular torque converter using Samples No. 1 to No. 4.

FIG. 7 is a graph showing a deformation amount ΔK when the hydraulic pressure on the engine 21 side of the lock-up clutch 16 inside the pump shell 12c has been increased and a predetermined rotation speed has been achieved, for a torque converter using Samples No. 1 to No. 4. This deformation amount ΔK is a shift amount in the direction of the axis C of the tip end of the cylindrical shaft 12f. The cylindrical shaft 12f protrudes toward the transmission 24 side from the radially inner portion of the rear shell 12b. The rigidity of the front shell 12a is evaluated as being higher the smaller this deformation amount ΔK is. According to FIG. 7, with Sample No. 1, the plate thickness t of the front shell 12a is greater than it is with Sample No. 2, so the deformation amount ΔK is approximately 1.7 mm, which is less than 2 mm in Sample No. 2. With Sample No. 1 and Sample No. 2, the space of the reinforcement rib L that protrudes from the front shell 12a is relatively large, so the space within which to house the damper device between it (i.e., the reinforcement rib L) the drive plate is limited. Therefore, the dimension of the torque converter in the direction of the axis C is larger. With Sample No. 3, the rigidity of the front shell 12a is increased due to the reinforcement effect of the annular set member 35. Thus, with Sample No. 3, the deformation amount ΔK is less than it is with Sample No. 2 in which plate thickness of the front shell 12a is the same 5 mm. In contrast, with Sample No. 4, the annular set member that fixes the driven plate 38 of the damper device 34 is provided on the radially inner portion of the front shell 12a, so compared with Sample No. 1, Sample No. 2, and Sample No. 3, the deformation amount ΔK is large, increased 50% or more.

As described above, according to the torque converter 10 of this example embodiment, the ring-shaped annular set member 35 for connecting the driven plate (i.e., the damper output member) 38 is fixed concentrically to the front shell 12a. The intermediate diameter D3 between the outer diameter D1 of the front shell 12a and the diameter D2 of the cylindrical shaft 12f is included within the width W of the annular set member 35 in the radial direction. As a result, the rigidity of the front shell 12a is able to be increased by a similar reinforcing effect as that of the rib, by the annular set member 35 that is fixed to the front shell 12a. Therefore, deformation of the pump shell 12c when the pressure of operating oil inside the pump shell 12c is increased or when centrifugal force is generated by the rotation of the pump shell 12c is suppressed.

Also, according to the torque converter 10 of this example embodiment, the annular set member 35 has the female screw holes 54 formed on the end surface of the annular set member 35 on the engine (i.e., the drive source) 21 side. The set bolts (i.e., fastening bolts) 52 is screwed into the female screw holes 54 and fasten the driven plate (i.e., the damper output member) 38 of the damper device 34 to the annular set member 35. The width W that is the dimension of the annular set member 35 in the radial direction is two to three times the diameter d of these female screw holes 54. Therefore, sufficient rigidity is able to be obtained in the annular set member 35 that is fixed to the front shell 12a, and this reinforcing effect of the annular set member 35 enables the rigidity of the front shell 12a to be increased. Thus, deformation of the pump shell 12c is inhibited.

Further, according to the torque converter 10 of this example embodiment, a thickness T that is the thickness dimension of the annular set member 35 in the direction of the axis C is two or more times greater than the plate thickness of the front shell 12a to which the annular set member 35 is fixed. Therefore, sufficient rigidity is able to be obtained in the annular set member 35 that is fixed to the front shell 12a, and this reinforcing effect of the annular set member 35 enables the rigidity of the front shell 12a to be suitably increased.

Moreover, according to the torque converter 10 of this example embodiment, the annular set member 35 is fixed by at least the outer peripheral edge thereof being welded to the front shell 12a. Therefore, the annular set member 35 is able to reliably function as a rib for increasing the rigidity of the front shell 12a.

Figure 8:
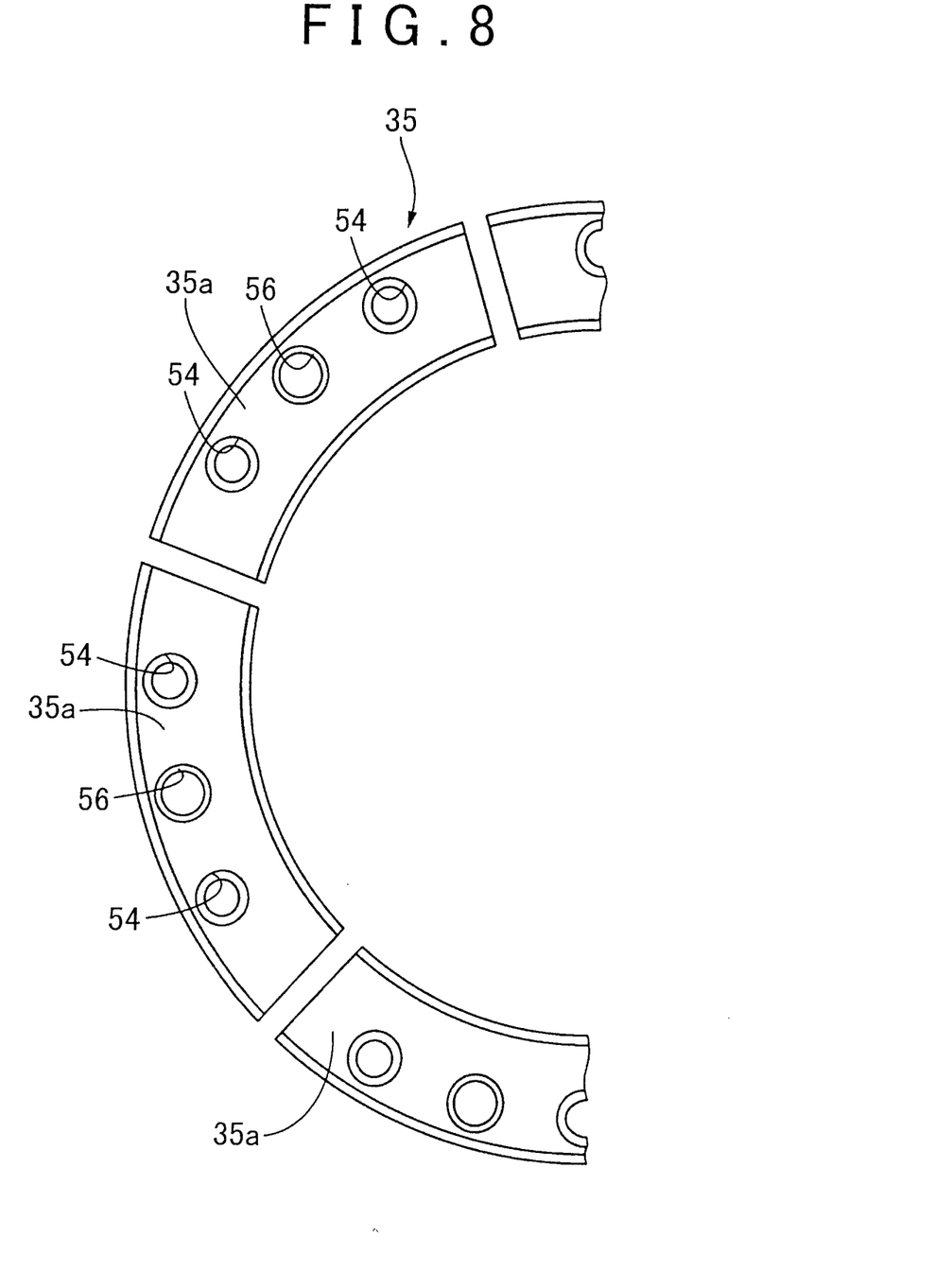
FIG. 8 is a front view showing the structure of an annular set member that is fixed to a pump shell of the vehicular torque converter according to a second example embodiment of the invention, in which half of the annular set member has been cut away.

FIG. 8 is a view of another example of the structure of the annular set member 35. The annular set member 35 in this example embodiment is divided, in the circumferential direction, into six sectors 35a that are arranged in the circumferential direction. When the number of sectors into which the annular set member 35 is divided is smaller, the rib effect achieved by the annular set member 35 is greater, but the annular set member 35 may be divided into any number of sectors within the range within which the rib effect can still be achieved by the annular set member 35. Having the annular set member 35 of this example embodiment be formed by a plurality of individual sectors 35a in this way facilitates manufacture.

While example embodiments of the invention have been described in detail with reference to the drawings, the invention may also be applied in other modes.

For example, in the example embodiments described above, the annular set member 35 is provided on the front shell 12a by the inner and outer peripheral sides thereof being welded to the front shell 12a. However, it is sufficient to have at least the outer peripheral side be welded. Also, the weld beads B formed by this welding are preferably continuous in the circumferential direction, but they do not necessarily have to be continuous. That is, the weld beads B may be provided in a plurality of locations at predetermined intervals to the extent that the rigidity of the pump shell 12c is able to be sufficiently obtained.

Also, in the example embodiments described above, the torque converter 10 is given as one example of the vehicular fluid power transmitting device, but the vehicular fluid power transmitting device may also be a fluid coupling.

Also, in the example embodiments described above, the damper device 34 has two types of damper springs, i.e., the large damper spring 36a and the small damper spring 36b, but it may also have one type or three types of damper springs. Also, the damper device 34 may have another structure or shape, e.g., the sizes and/or positions of the damper springs may be different.

Further, in the example embodiments described above, the blades 12d of the pump impeller 12, the blades 14d of the turbine runner 14, and the blades 20d of the stator 20 are offset toward the output side. However, the offset amount does not necessarily have to be such that the blades 20d of the stator 20 are offset to a position where they do not overlap with the one-way clutch 18.

The example embodiments and modes described above are merely examples. The invention may also be carried out in modes that have been modified or improved in any of a variety of ways based on the knowledge of one skilled in the art.

The invention claimed is:

1. A vehicular fluid power transmitting device comprising:
   a pump impeller that has a plurality of pump blades provided inside of a pump shell to which torque from a drive source is input, the pump shell having a rear shell and a front shell connected to the rear shell;
   a turbine runner that has a plurality of turbine blades and a hub portion, is supported by a shaft end portion of an output shaft, and is rotated by receiving operating fluid pushed out by the pump blades, the turbine blades being provided in positions opposite the pump blades, and the hub portion supporting the turbine blades;

a damper device that is provided between the drive source and the pump shell in an axial direction of the output shaft, and has a damper input member and a damper output member, the damper input member being connected to the drive source, and the damper output member transmitting torque transmitted via an elastic member from the damper input member, to the pump shell; and a ring-shaped annular set member that connects the damper output member to the front shell and is fixed to the front shell, wherein:

the rear shell has the plurality of the pump blades and a cylindrical shaft;

the pump blades are formed in a radially outer portion of the rear shell;

the cylindrical shaft is formed in a radially inner portion of the rear shell and protrudes in a direction away from the drive source;

an intermediate position between a position of an outer radius of the front shell and a position of a radius of the cylindrical shaft is included in a width of the annular set member in a radial direction of the annular set member;

the annular set member is fixed by at least a radially outer side of the annular set member being welded to the front shell; and an intermediate radius from an axis of the output shaft to the intermediate position is represented by an equation:

$$R3=(R1-R2)/2+R2$$

Where R1 is the outer radius of the front shell, R2 is the radius of the cylindrical shaft, and R3 is the intermediate radius.

2. The vehicular fluid power transmitting device according to claim 1, wherein the annular set member is fixed concentrically to the front shell.

3. The vehicular fluid power transmitting device according to claim 1, wherein:

the annular set member has a female screw hole formed on an end surface of the annular set member on a drive source side, a fastening bolt being screwed into the female screw hole and fastening the damper output member to the annular set member; and the width of the annular set member in the radial direction is two to three times, inclusive, a diameter of the female screw hole.

4. The vehicular fluid power transmitting device according to claim 1, wherein a thickness in the axial direction of the annular set member is two or more times a plate thickness of the front shell to which the annular set member is fixed.

* * * * *